United States Patent [19]

Minematsu et al.

[11] Patent Number: 4,864,109

[45] Date of Patent: Sep. 5, 1989

[54] ELECTRONIC BANKBOOK AND TRANSACTION SYSTEM FOR USE THEREWITH

[76] Inventors: Nobuo Minematsu; Yoshinori Koshida, both of c/o Oki Electronic Industry Co., Ltd., 7-12, Toranomon 1-chome, Minato-ku, Tokyo, Japan

[21] Appl. No.: 796,449

[22] Filed: Nov. 8, 1985

[30] Foreign Application Priority Data

| Nov. 12, 1984 | [JP] | Japan | 59-236744 |
| Nov. 19, 1984 | [JP] | Japan | 59-242265 |
| Nov. 22, 1984 | [JP] | Japan | 59-246091 |
| Nov. 26, 1984 | [JP] | Japan | 59-248178 |
| Jan. 18, 1985 | [JP] | Japan | 60-5783 |

[51] Int. Cl.⁴ ............................................. G06F 15/30
[52] U.S. Cl. ..................................... 235/379; 235/492
[58] Field of Search ........................ 235/379, 380, 492

[56] References Cited

U.S. PATENT DOCUMENTS

| 3,906,460 | 9/1975 | Halpern . | |
| 4,001,550 | 1/1977 | Schatz . | |
| 4,394,654 | 7/1983 | Hofmann-Cersontaine | 235/380 |
| 4,449,040 | 5/1984 | Matsuoka et al. | 235/379 X |
| 4,498,000 | 2/1985 | Decavele et al. | 235/379 X |
| 4,523,087 | 6/1985 | Benton . | |
| 4,536,647 | 8/1985 | Atalla et al. . | |
| 4,575,621 | 3/1986 | Dreifus | 235/492 X |
| 4,590,365 | 5/1986 | Okada | 235/379 |
| 4,614,861 | 9/1986 | Pavlov et al. | 235/380 |

FOREIGN PATENT DOCUMENTS

| 899285 | 7/1984 | Belgium . |
| 0131906 | 1/1985 | European Pat. Off. . |
| 0162221 | 11/1985 | European Pat. Off. . |
| 3222288 | 12/1983 | Fed. Rep. of Germany . |
| 2473755 | 7/1981 | France . |
| 56-14369 | 2/1981 | Japan . |
| WO82/03484 | 10/1982 | PCT Int'l Appl. . |
| WO83/03694 | 10/1983 | PCT Int'l Appl. . |

OTHER PUBLICATIONS

IBM Technical Disclosure Bulletin, vol. 23, No. 2, Jul. 1980, "Identification Card", pp. 673-675.
Schaltungsanordnung zum Ausgleichen nichtlinearer Verzerrung in CTDs, 592 Neues aus der Technik, Sep. 1980, No. 4/5, Wurzberg BRD, p. 2.

Primary Examiner—David L. Trafton

[57] ABSTRACT

A transaction system includes a card-shaped electronic bankbook and a transaction device. The electronic bankbook includes an IC chip encapsulated in an insulating card substrate and composed of a CPU and data memories display, a key switch including keys for instructing transaction data items and switching display data, a power supply, and an interface for receiving or delivering a signal on transactions from or to a transaction device. The system has a crime prevention function where transactions are made invalid if identification information on the electronic bankbook is erronesouly entered in repetition over the prescribed number of times into the transaction system of the electronic bankbook.

3 Claims, 13 Drawing Sheets

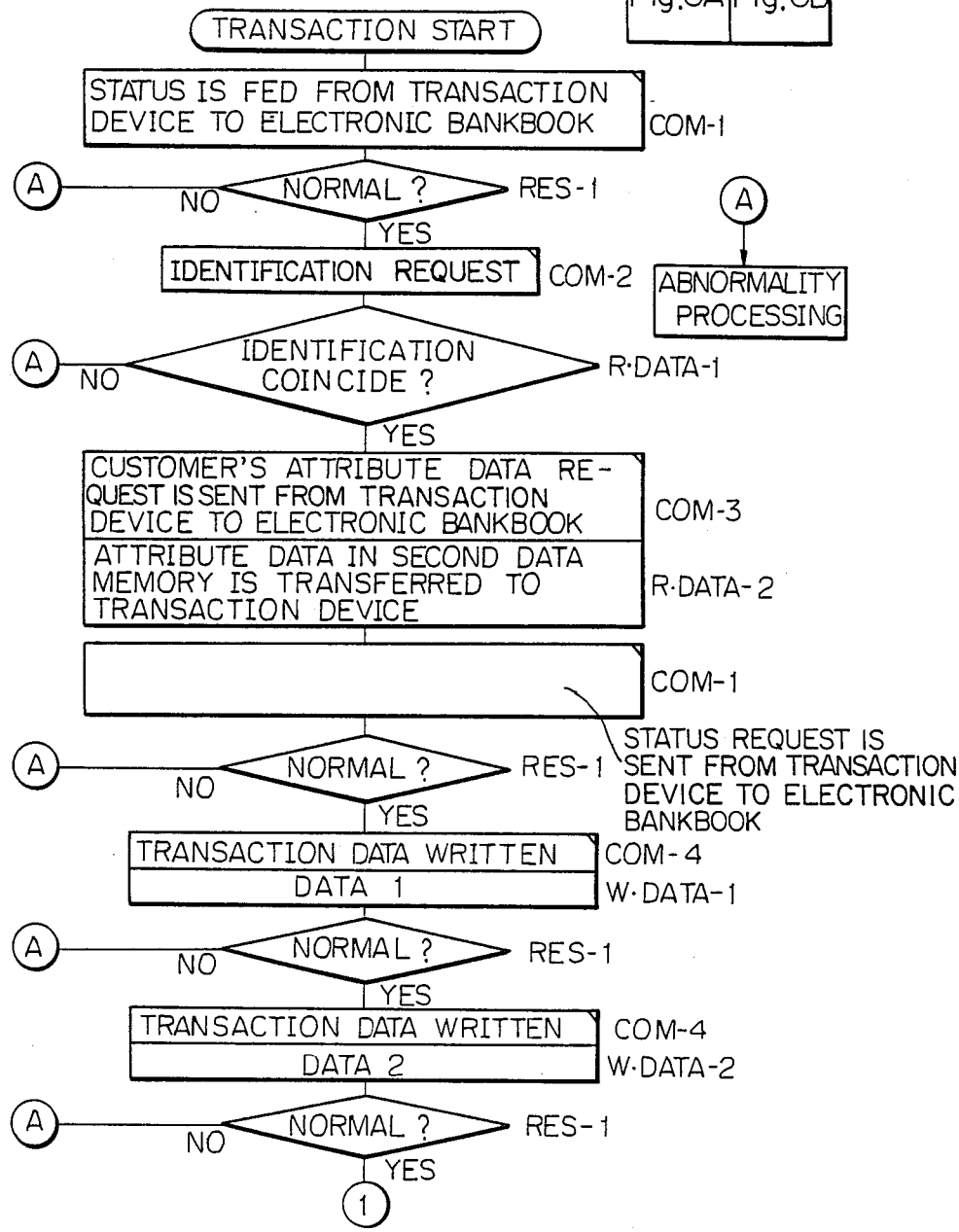

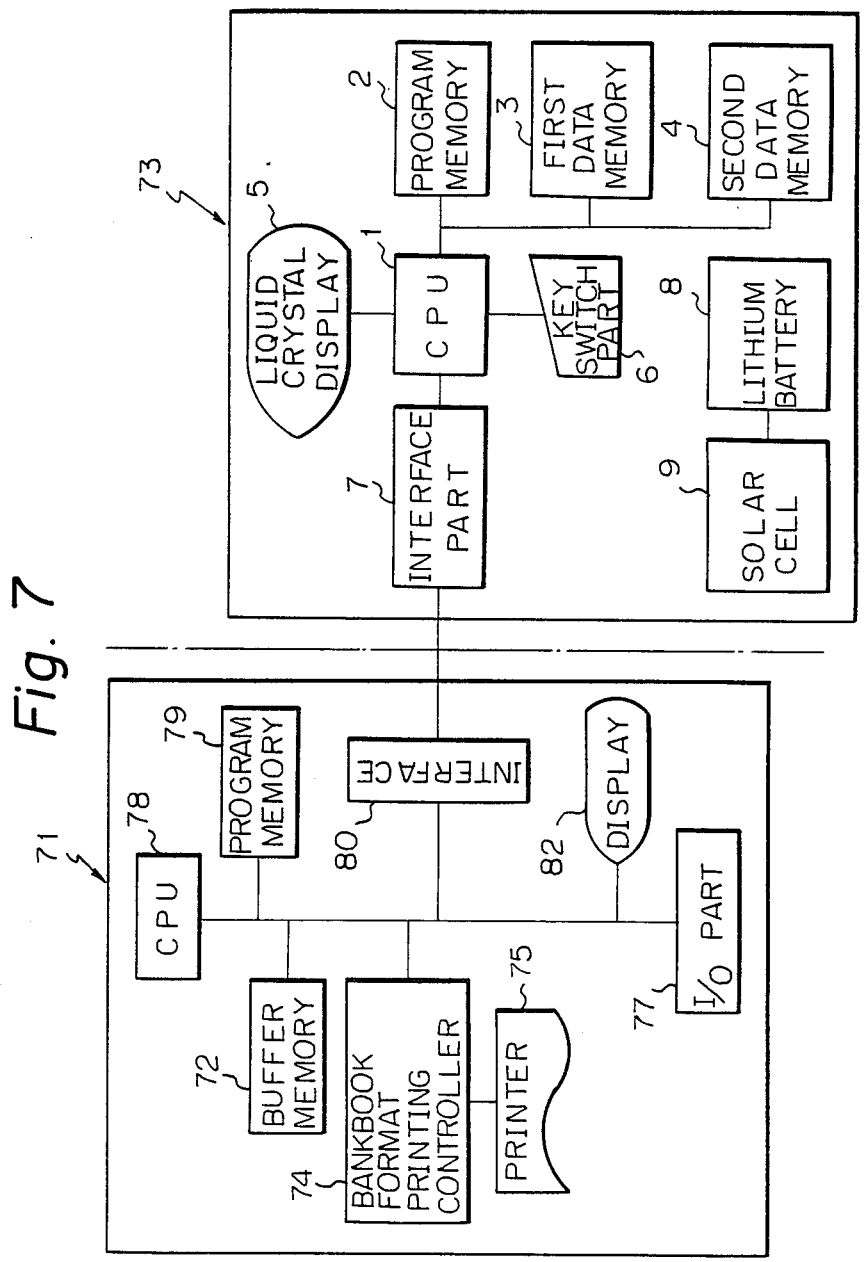

Fig. 8

76 PRINTING MEDIUM

| DATA | REMARKS | AMOUNT PAID | DEPOSIT | BALANCE |
|---|---|---|---|---|
| 61.03.06 | PAYMENT | | 83,000 | 1,285,000 |
| 61.03.23 | GAS | 11,000 | | 1,274,000 |
| 61.03.10 | ELECTRIC CHARGES | 4,700 | | 1,269,300 |
| 61.03.15 | MONEY PAID | 40,000 | | 1,229,300 |
| 61.03.10 | PAYMENT | | 100,000 | 1,329,300 |

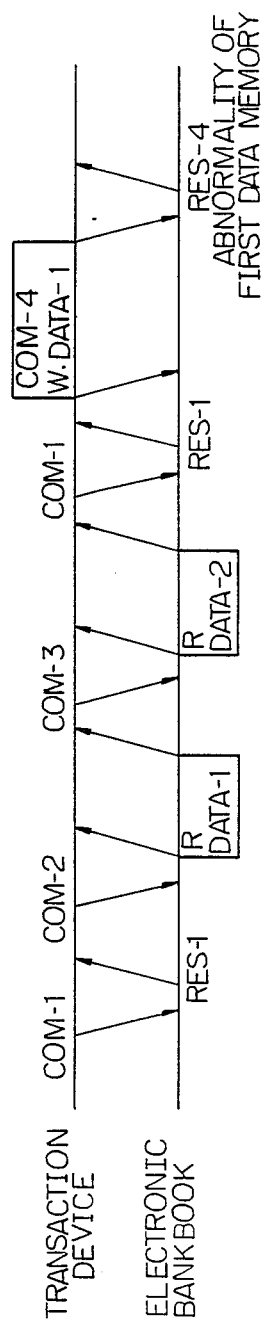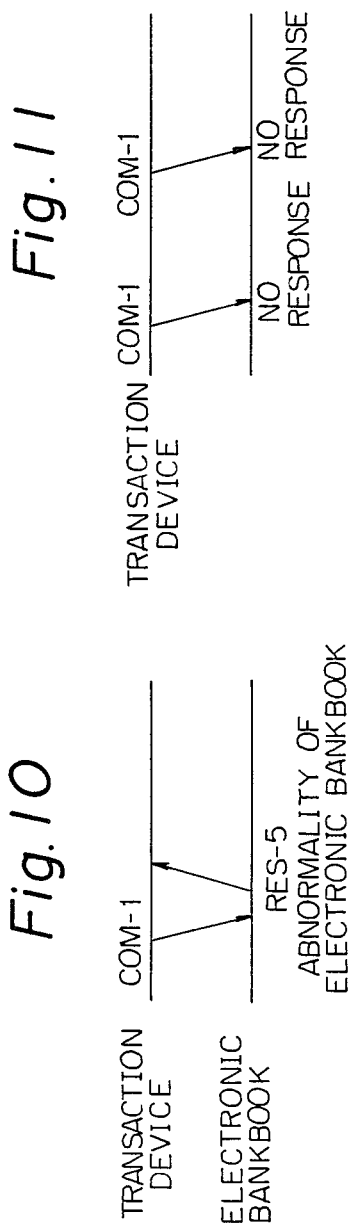

ELECTRONIC BANKBOOK AND TRANSACTION SYSTEM FOR USE THEREWITH

BACKGROUND OF THE INVENTION

1. Field of the Invention

The present invention relates to an electronic bankbook and a business system for use therewith.

2. Description of the Prior Art

In recent years, banking organs such as banks have been conspicuously advanced in the use of electronics and mechanization, while various mechanized systems, which will be called electronic banking in the near future, have been investigated.

Among such organizational reforms, a deposit and savings passbook has been considered for use as an electronic bankbook by the use of an IC card. Provided that this is put into operation, more versatile applications of the bankbook can be anticipated without losing the use of a conventional bankbook in a booklet form.

A prior booklet type bankbook is limited in the quality of the paper and the number of sheets thereof, etc., due to structural restraint of the apparatus used for recording the transactions therein. Many requirements from banking organs for a low-cost bankbook with an increased number of sheets have not been satisfied at present.

In a booklet type bankbook, the lack of a large number of sheets brings about insufficient capacity to house data therein. In particular, when a plurality of transaction items are put together in one bankbook, the insufficiency of data housing capability becomes more and more conspicuous. This brings about an increase of the issued number of new bankbooks, and prevents costs from being reduced. In this connection, a booklet type bankbook now in use can store 4 to 8 kilobytes of data (printout). In addition, since a bankbook employed in banking organs records transactions results, it is also important to directly read out the contents of the bankbook.

By contrast, an IC card comprises an IC chip having a CPU and data memories, etc., a display, key switches, and a battery, etc., mounted on an insulated card substrate. The IC card can store business data, etc., in data memories, while it can display the data on a display by reading out it from the memories by a key operation. Accordingly, it can sufficiently serve as a deposit and savings passbook.

Moreover, with the rapid progress of semiconductor technology in recent years, a 256 kilobyte CMOS RAM is available as a data memory, and also a large capacity data memory can be packaged in an IC card. Accordingly, the data storage capacity of an IC card has been improved by a large margin as compared with that of a booklet type bankbook, and one sheet of the IC card can correspond to several booklet bankbooks in storing transaction data.

Hereupon, in financial organs such as banks, in order to improve services for customers, expand transactions, and investigate the financial status of customers, attribute data of the customers are stored in a customer data file. The customer data includes, besides a bank number, an account number, and a load limit, a tax-free small-sum savings limit, his address, the age of the customer, a telephone number, a family makeup, and data concerning privacy, etc. Consequently, since a large amount of data is involved, the data storage capacity of a file system in a data processing center of a banking organ must be enormous.

Since a banking organ carries on not only transaction data, but attribute data of customers in such a way, a memory system is increasingly required to have a high speed and large-size for processing such data.

Thereupon, with use of the electronic bankbook as a deposit and savings bankpass, a load of a memory file system can be reduced by storing attribute data of a customer because of its large data storage capability.

Such an IC card has an identification code therein, which serves as a credit code between a bank and a customer like a key function of a prior magnetic card. Namely, an IC card is inserted into a machine such as an automatic cash dispenser, and a proper identification code which is previously imparted to a possessor of the IC card is entered into the automatic cash dispenser by operation of a keyboard. The cash dispenser checks the correspondence between the entered identification code and a data from the IC card, and only when the correspondence is as previously specified, is the machine operated.

As described above in detail, an identification code of an IC card serves as an important key function for checking that a person with the card is the person in question. In addition, for the identification code, a four-figure secret number have been frequently used up to now due to the limited memory capacity of the card possessor. This has been widely used in, besides banks, stores, automatic cash dispensers and identification cards, and established at present.

However, such a prior IC card has a drawback in that the number of characters which can be displayed on a display of the IC card is limited to from 32 to 64 because of its limited size, i.e., only characters corresponding to one transaction can be displayed at best, as compared with a case of a paper bankbook in which one page's transaction data can be exhibited at a time. Therefore, for an electronic bankbook using an IC card, a problem remains to be solved in that characters on a display must be seen with ease.

In addition, attribute data of a customer is treated as a confidential matter on the banking organ side, and is not available to the customer, in principle. Accordingly, attribute data of a customer cannot be stored in a data memory which stores transaction data therein. As a result, a problem is produced in that the attribute data must be processed in a data processing center of a banking organ.

Moreover, the data memory, although having a mass storage, is limited in its data storage capability. Accordingly, when data is written into the memory up to its limit, the electronic bankbook must be renewed or new data must be written into the data memory from the beginning of addresses thereof. In detail, in the former case wherein an electronic bankbook must be renewed every time data is written up to a limit of the data memory, it costs a great deal since an electronic bankbook is expensive, and takes a certain time for its issue. In the latter case, transaction data already written in the data memory is erased by writing new data therein. This causes a problem from a viewpoint of reliability.

In addition, in an IC card employed with an identification code such as a four-figure secret number, it is not discriminated whether the identification code is erroneously set due to a poor memory of a holder of the card or is a mistaken identification code set by a dishonest user, for example. Particularly, there is a severe problem if the identification code is set many times using an IC card acquired by a dishonest user, until the user finally reaches the prescribed identification code, and a key is released so as to lead to the improper use of the IC card.

SUMMARY OF THE INVENTION

In view of the drawbacks with the conventional electronic bankbook, it is an object of the present invention to provide an improved electronic bankbook and a transaction system using the improved electronic bankbook.

Another object of the present invention is to provide an electronic bankbook improved in its treatment and its functions by making it possible to selectively display transaction details on each item of a general account comprising an ordinary deposit and a fixed deposit.

Still another object of the present invention is to provide an electronic bankbook capable of storing customer's secret attribute data in a data memory without losing secrecy as well as reducing loads subjected to a memory file system in a data processing center of a banking organ.

A still further object of the present invention is to provide an electronic bankbook capable of employing a data memory in repetition without erasing written transaction data so as to cut down the expenses thereof as well as issuing a new electronic bankbook without troubling a customer when it is impossible to write data due to fault of the data memory.

Another object of the present invention is to provide an electronic bankbook wherein transactions are stopped when more than the prescribed number of times of an identification operation are erroneously entered into an automatic cash dispenser, whereby an IC card is prevented from being improperly used so as to protect the interests of a proper customer, and wherein such an IC card can be immediately discriminated to be invalid as well as allowing the IC card to again be used by subjecting it to specific processing.

Still another object of the present invention is to provide an electronic bankbook wherein an electronic bankbook processing device capable of printing out memory information written in the electronic bankbook is provided, whereby a bank's customer using the electronic bankbook can see transaction data with ease without a sense of incompatibility as compared with a prior paper bankbook, and the business data can be permanently recorded and stored in the electronic bankbook and the electronic bankbook, being an electronic device, can be employed in repetition.

To achieve the above objects, an electronic bankbook has an IC chip comprising a CPU and a data memory, etc., encapsulated in an insulating card substrate, a display, key switches, power supply means and signal delivery means from or to an external device, and is adapted to selectively display transaction data of a general account stored in the data memory using an operating switch.

The electronic bankbook further includes a means for detecting a near end state where an amount of data stored in a data memory substantially reaches a limit of storage capacity of the memory and an enable state for writing data into a first data memory and for delivering the signal to a transaction device.

The electronic bankbook further includes a means for stopping transactions by connecting the bankbook with a bankbook transactions device when more than the prescribed number of times of identification inform action inputs are provided, a display means for displaying thereafter that the transaction is invalid every time an operating switch is depressed, and a memory means for storing stored business details successively as is.

With the arrangement described above, the objects of the present invention can be achieved.

The above and other objects, feature and advantages of the present invention will become more apparent from the following description when taken in conjunction with the accompanying drawings in which a preferred embodiment of the present invention is shown by way of illustrative examples.

BRIEF DESCRIPTION OF THE DRAWINGS

FIG. 7 is a block diagram showing a state in which the electronic bankbook and a transaction device are connected to each other;

FIG. 8 is a plan view showing an example of a bankbook printing format printed by a printer of the transaction device;

FIG. 9 is a diagram illustrating a data transmission control procedure between the transaction device and the electronic bankbook and a manner of detection of an abnormality in the first data memory;

FIG. 10 is a diagram illustrating a case where the electronic bankbook does not respond to any operation;

FIG. 11 is a diagram illustrating a case where the electronic bankbook does not respond to any operation;

DESCRIPTION OF THE PREFERRED EMBODIMENT

Figure 1:
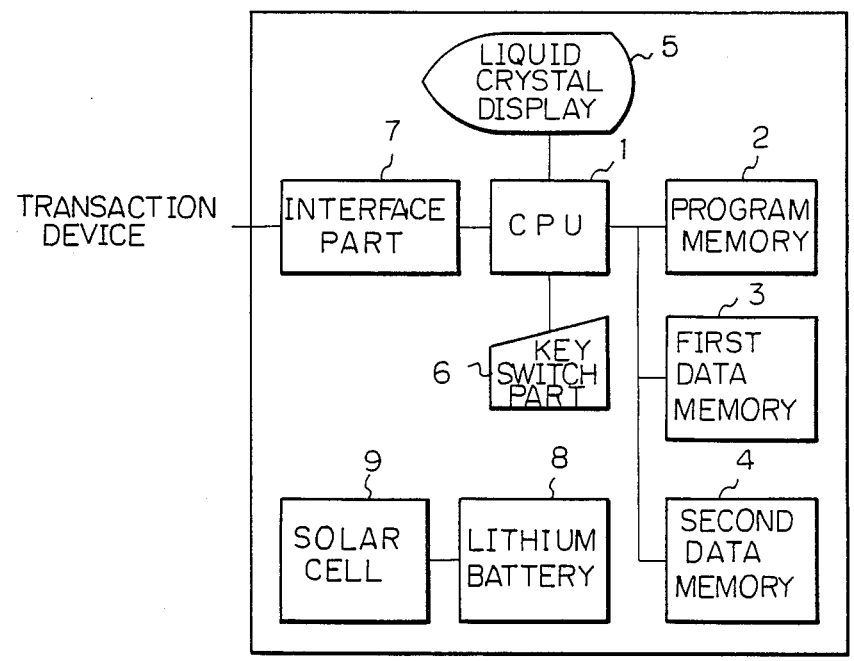
FIG. 1 is a block diagram illustrating an embodiment of an electronic bankbook according to the present invention.

As shown in FIG. 1, element 1 is a CPU, e.g.—a 4 bit C MOS CPU, which controls internal components of an electronic bankbook, such as a program memory 2 connected to the CPU, and connects the electronic bankbook to a transaction device.

Element 3 is a first data memory connected to the CPU 1 and to the program memory 2 for storing transaction data showing a transaction result, for which, for example, an 8 to 64 kilobyte C MOS RAM is employed. Element 4 is a second data memory connected to the CPU 1, and program memory 2, and the first data memory 3 for storing identification number data and customer attribute data, etc., for which an 8 to 64 kilobyte C MOS RAM may be employed as in the first data memory 3. The first data memory 3 is distinguished from the second data memory in their addresses. Only data stored in the first data memory 3 is displayed on a liquid crystal display 5.

Element 6 is a key switch part employed for displaying data stored in the data memory 3 on the liquid crystal display 5, and element 7 is an interface for connecting the CPU 1 to a transaction device.

Figure 2:
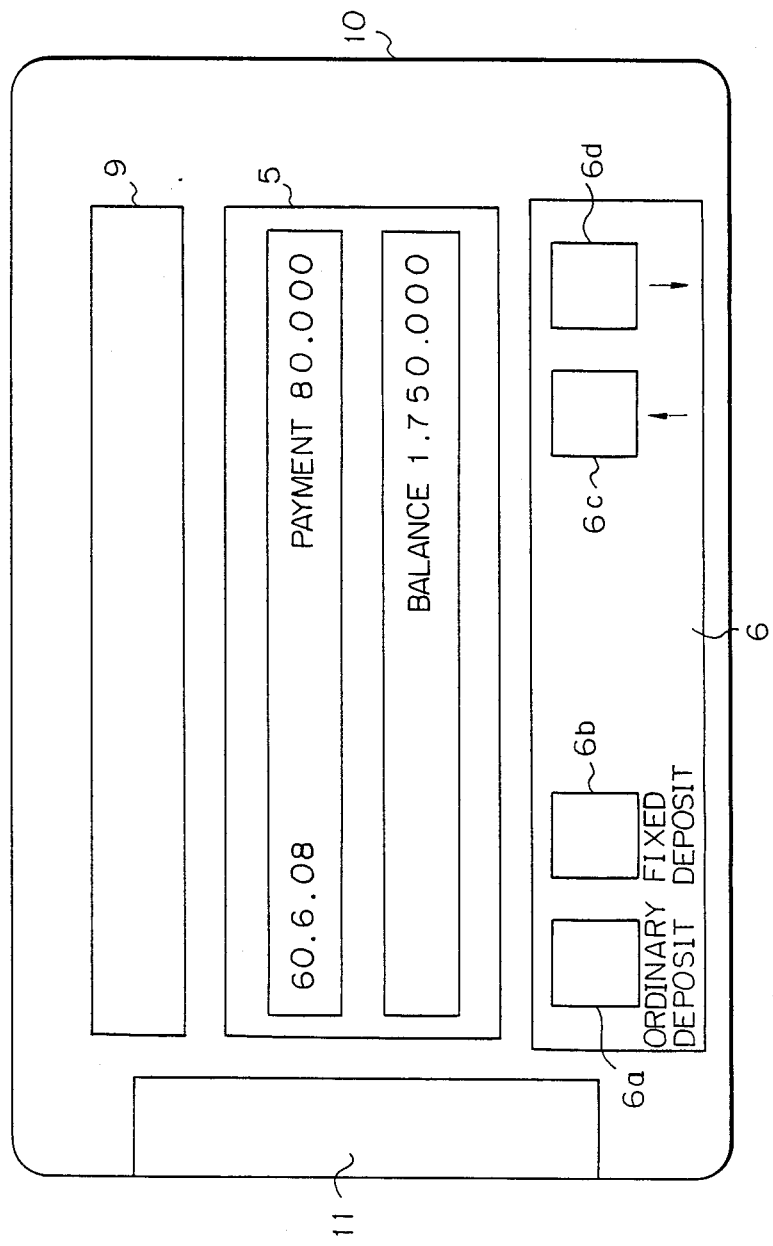
FIG. 2 is a front view showing an outer appearance of the electronic bankbook.

As shown in FIG. 1 and FIG. 2, elements 8 and 9 are power supply means connected to each other. Element 8 is a lithium battery for backing up the contents of the first and second data memories 3 and 4, while element 9 is a solar battery which serves as a main power source for the electronic bankbook. Element 10 is an insulating card substrate, which includes a liquid crystal display for displaying, for example, 32 characters×2 lines, the key switch part 6 having keys 6a–6d each for designating items of transaction data and switching display data, and the solar cell 9 for supplying sufficient power to the electronic bankbook to permit it to start to fulfill its function even under light from a fluorescent lamp on the surface of the substrate 10. The insulating card substrate further includes therein the IC chip comprising: the CPU 1, program memory 2, first data memory 3, and second data memory 4, etc., and the lithium battery 8.

Furthermore, element 11 is a connection part to the transaction device for receiving or transmitting a signal from or to a photocoupler.

Next, the operation of the above noted arrangement will be described.

First, when new transactions are produced between a customer and a banking organ, for example, when the customer opens a new account in a general account, the banking organ connects the electronic bankbook to a transaction device for the transactions. Then, a secret number and attribute data of the customer as a bankbook holder are written, besides a new deposit, simultaneously in the first data memory 3 and the second data memory 4, respectively. The customer receives the bankbook after the transactions are completed. Namely, an electronic bankbook is issued for the customer by the banking organ.

Thereafter, non-entered data stored in the center file of the bank is written in the first data memory 3 of the electronic bankbook. Thereupon, the transaction device can read out customer's attribute data stored in the second data memory 4 of the electronic bankbook and process transaction data based on the read data.

In addition, when the bankbook is not connected to the transaction device, transaction data stored in the first data memory 3 can be displayed on the liquid crystal display 5 by operating the key switch part 6 of the electronic bankbook.

Namely, by depressing a savings deposit key 6a which is one of item keys of the key switch part 6, transaction data showing the latest transaction contents of the savings deposit is displayed on the liquid crystal display 5 according to a bankbook format as shown in FIG. 1. If preceding transaction contents is to be seen, by depressing a key 6c for changing the display, data going back to the past is displayed, and transaction data of interest are displayed on the liquid crystal display 5. In addition, by depressing a key 6d, newer transaction data than that presently displayed are displayed.

Moreover, by depressing a fixed deposit key 6b for instructing the data display of a fixed deposit, business data showing the newest business contents are displayed on the liquid crystal display 5 according to a bankbook format. Also in this case, display data can be changed by operating the keys 6c, 6d as in the above description.

Next, the operation of the electronic bankbook according to the present invention will be described in further detail with reference to FIGS. 3 and 4.

Figure 3:
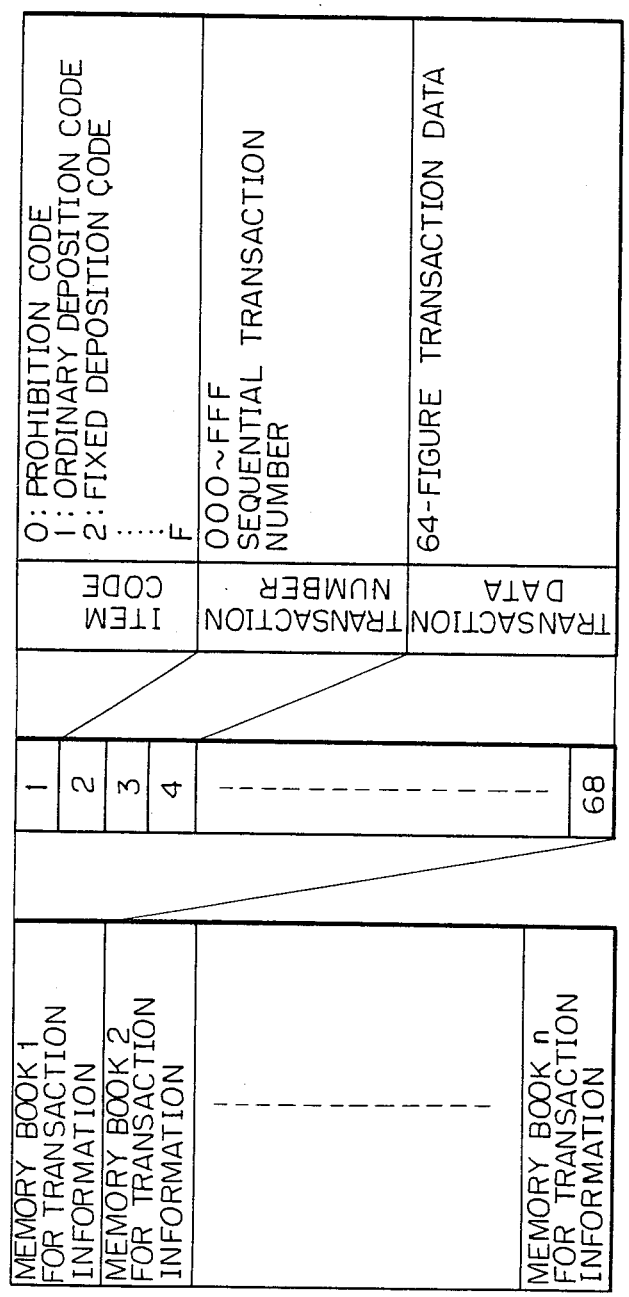
FIG. 3 is a schematic view showing a data format of a first data memory 3.
Figure 4:
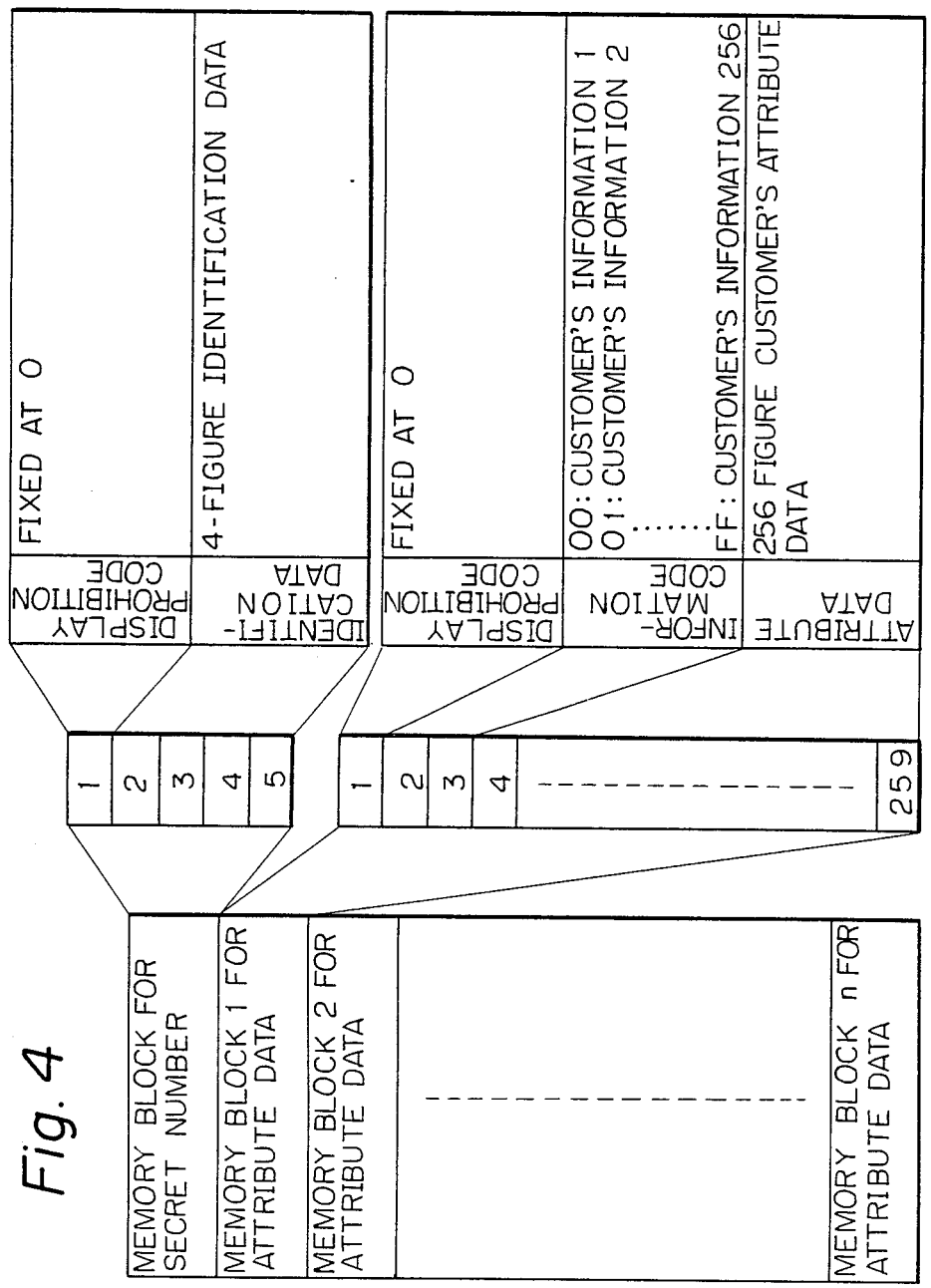
FIG. 4 is a schematic view showing a data format of a second data memory 4.

As shown in FIG. 3, the first data memory 3 has 1 to n memory blocks for transaction data, each memory block comprising 68 bytes. The first byte is used for an item code, 2nd to 4th for transaction numbers, and 5th to 8th for transaction data.

Depressing an item key of the key switch part 6, e.g., the savings key 6a, the CPU 1 finds a memory block for transaction data in the first data memory 3 which has a "1" as an item code shown in the first byte thereof. The CPU further finds the largest numerical value from among three-figure transaction numbers shown on the 2nd, 3rd, and 4th bytes in the memory block having the item code "1", and displays a transaction data stored in the memory block on the liquid crystal display 5. Thereafter, if the key 6c is depressed, the CPU finds a memory block having a numerical value yielded by subtracting 1 from the displayed transaction number and displays transaction data stored in the just above memory block. If the key 6d is depressed, it finds a memory block having a numerical value yielded by adding 1 to the displayed transaction number, and displays transaction data stored in the memory block on the liquid crystal display 5.

In writing transaction data from a transaction device of a banking organ into an electronic bankbook, the electronic bankbook discriminates from among item codes stored in the first data memory 3 to find a maximum value of transaction numbers in memory blocks having the same item code, and takes a value yielded by adding 1 to the above noted maximum value as a transaction number, inserts it between the item code and the transaction data, and writes the result in the first data memory 3. Then, a "0" as an item code is used as a display-prohibited code, i.e., for the second data memory 4 described later. Accordingly, codes other than "0", for example, "1", is written as an ordinary deposit code, and "2" as a fixed deposit code.

By contrast, the second data memory 4 has a 5-byte memory block for secret numbers and 1 to n memory blocks for customer's attribute data each comprising 259 bytes. The memory block for secret numbers uses a first byte for a display-prohibited code, and two to fifth bytes for indentification data. Each of the memory blocks for attribute data uses a first byte for a display-prohibited code, second and third bytes for information code, and 4th to 259th bytes for attribute data. Here, all the display-prohibited codes of respective memory blocks are fixed at "0".

The second data memory 4 is distinguished from the first data memory 3 in their memory addresses. Contents of these memory addresses are programmed in the CPU 1 such that they can not be displayed on the liquid crystal display 5 of a single electronic bankbook.

More in detail, the CPU 1 decides the starting addresses, i.e., the first bytes of respective memory blocks of the first and second data memories 3, 4, and it, if the starting addresses are "0", forces the liquid crystal display 5 not to display them as a display-prohibited data.

In addition, in 4th to 259th bytes used for the attribute data of the second data memory 4, data needed by the banking organ, for example, degree of confidence of a customer, place of employment, annual income, and estate have been written. They can be used at need, for example, for judgement upon financing. These data are fixed at "0" as display-prohibited codes, and not displayed on the liquid crystal display 5 of a single electronic bankbook.

Upon newly issuing an electronic bankbook, a customer's identification data, an information code, and an attribute data are written in the second data memory 4 formatted by a bankbook issuing device. Described more concretely, when new transactions are produced between a banking organ and a customer, for example, when the customer is desirous of opening a new account of a general account with the banking organ, the banking device for transactions. Then, a secret number and an attribute data of a customer, a holder of the bankbook, etc., are simultaneously written in the first and second data memories 3, 4, respectively, together with new payment transactions. After the transactions are complete, the electronic bankbook is delivered to the customer. Namely, an electronic bankbook is issued from the banking organ to the customer.

Moreover, when a customer's attribute data is intended to be added and renewed, an attribute data write command is issued at need from the transaction device to the electronic bankbook, whereby the data is stored in unemployed memory blocks in the second data memory 4 taking a data comprising 258 bytes as one block.

During transactions, provided that the electronic bankbook is connected to the transaction device, a request command for a secret number of transmitted from the transaction device to the electronic bankbook, whereby the CPU 1 takes out t bytes from the starting address of the second data memory 4, and transfers 2 to 5th byte data except for a display-prohibited code of the first byte to the transaction device. Thereafter, with the confirmation of the customer himself by coincidence of an identification number given by customer's operation with the transferred secret number, a request command for customer's information needed for the transactions is issued from the transaction device to the electronic bankbook. The CPU 1 decides a customer's information code addressed in the customer's information request command, and transfers only information corresponding to the addressed code to the transaction device. Namely, the CPU 1 transfers to the transaction device 258 bytes from the 2nd on except for a first byte, i.e., a display-prohibited code in a memory block in which information codes shown on the 2nd and 3rd bytes in a customer's attribute data memory block comprising 259 bytes belonging to the second data memory 4 coincide with the decided customer's information codes.

The transaction device displays, on a display thereof, establishment or unestablishment of the transactions or customer's service information, for example, information on the expiration data of a fixed deposit, information on deposit effective investment, and balance information of a tax-free small-sum savings limit, etc., based on the above-described customer's attribute data. The transactions further go forward, and if concluded, transaction data is transferred to the electronic bankbook. The CPU 1 stores the data in the first data memory 3, and the transactions are complete.

Repeating transactions in such a way, the data storage capacity of the first data memory 3 reaches the limit in a short time. For writing the transaction data in the memory 3 in succession, it is necessary to erase transaction data already written and stored in the memory.

Figure 5:
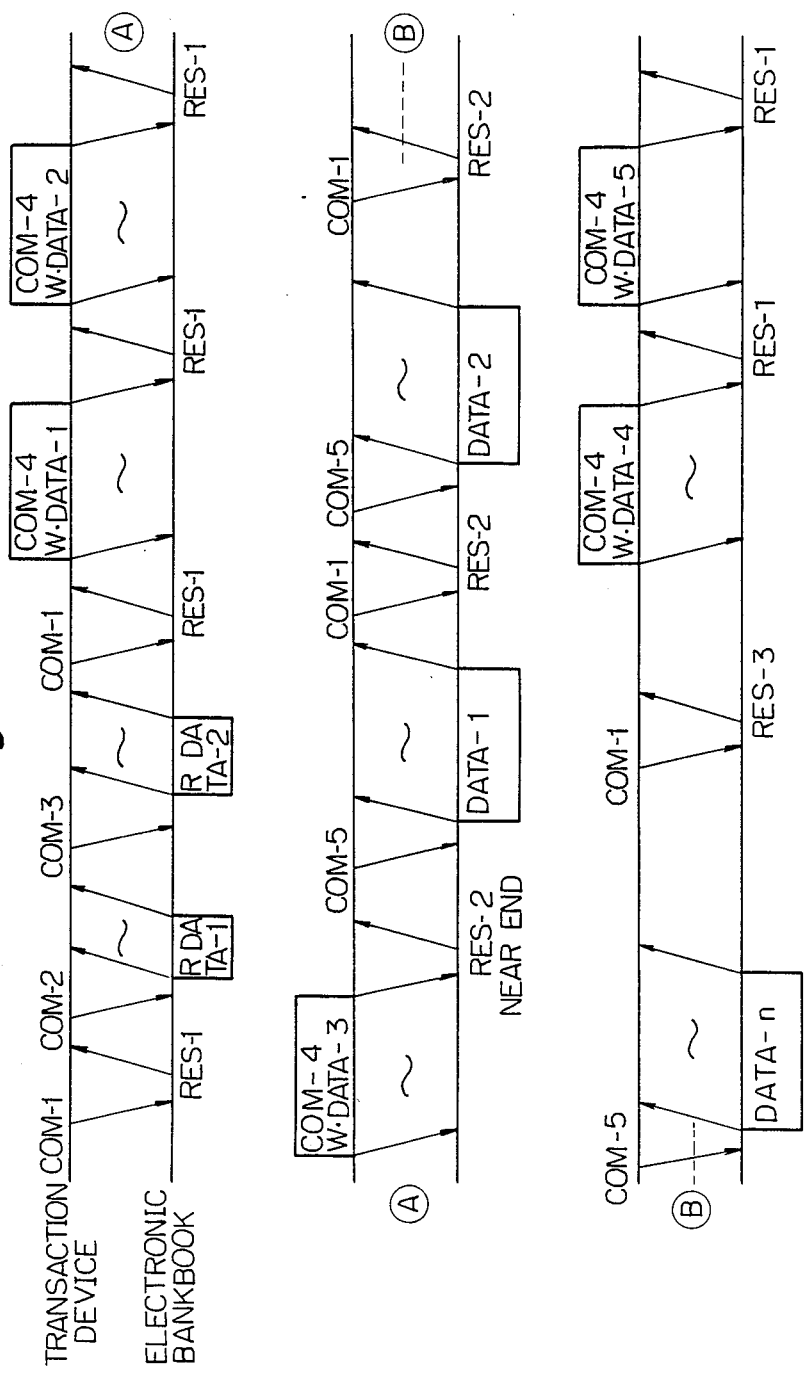
FIG. 5 includes A and B diagrans each showing a data transfer control procedure between the transaction device and the electronic bankbook, and showing detection of a near end state of the electronic bankbook.
Figure 6B:
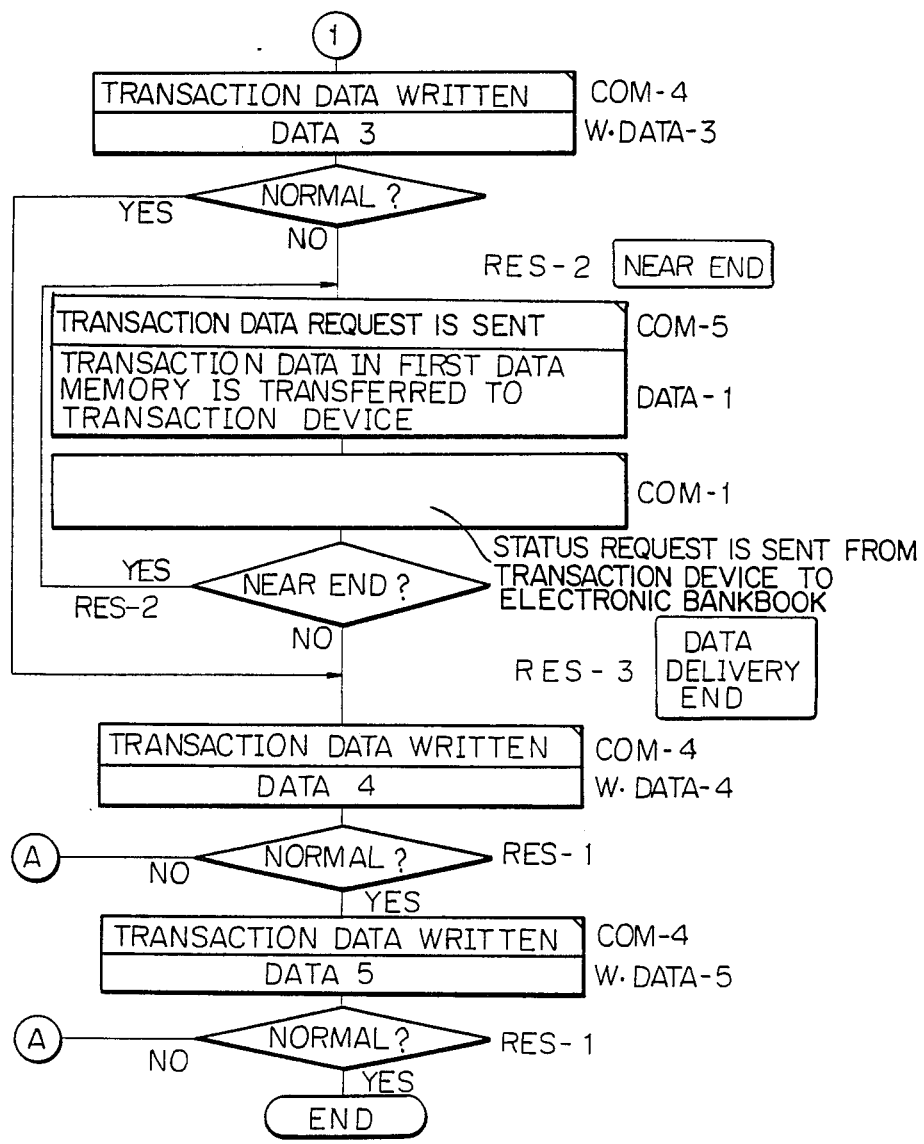
FIG. 6, consisting of FIGS. 6A-6B together comprise flowcharts corresponding to the diagram of FIG. 5.
Figure 12:
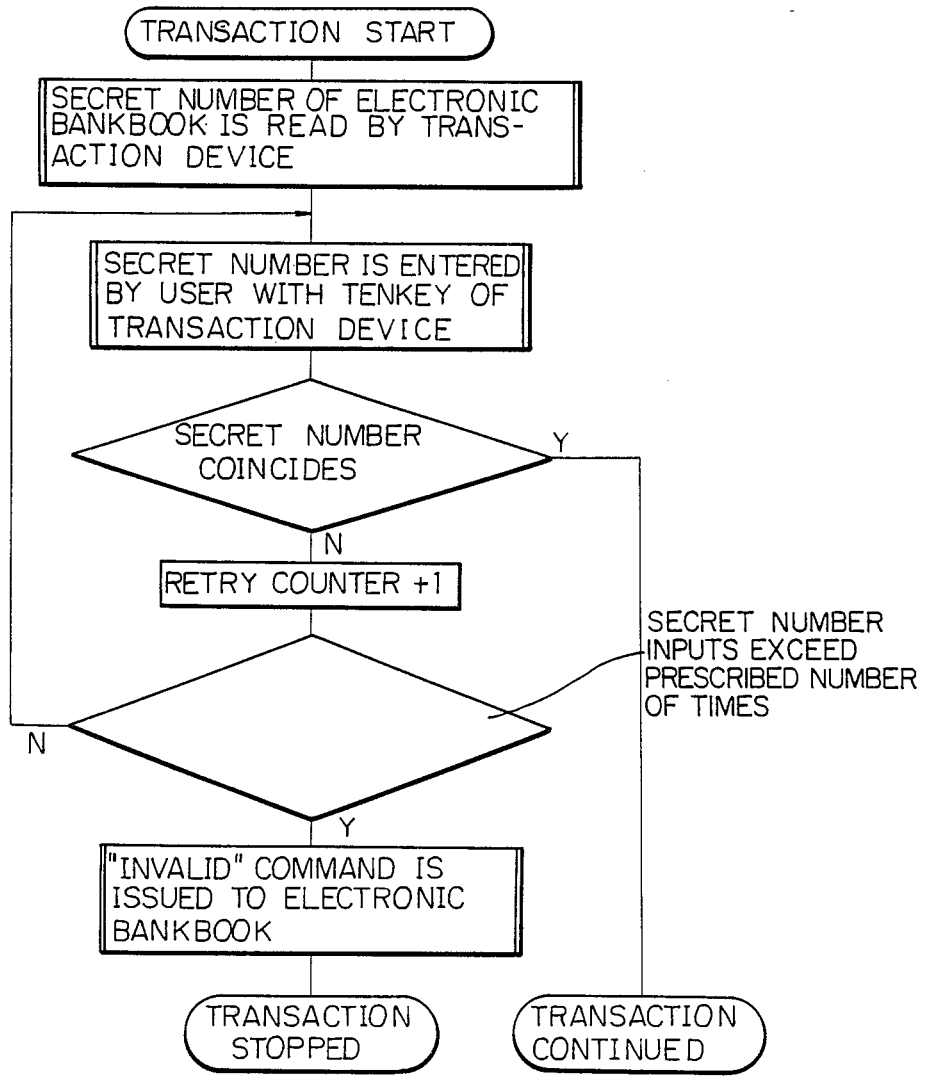
FIG. 12 is a flowchart showing a procedure for transaction execution processing using the electronic bankbook 73 in FIG. 7.
Figure 13:
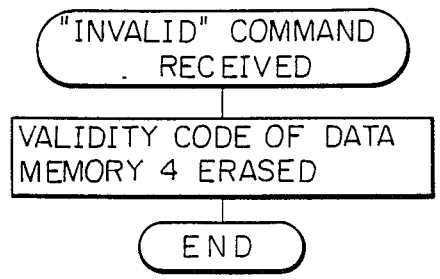
FIG. 13 is a flowchart illustrating an invalidity processing procedure of the electronic bankbook.

The procedures will be described below with reference to FIGS. 5 and 6.

First, the transaction device issues a status lead command signal COM-1 (hereinafter abbreviated simply as COM-1) to the electronic bankbook for obtaining information on a connection state between the transaction device and the electronic bankbook as well as a state of the electronic bankbook. The electronic bankbook decides whether or not the bankbook is abnormal in the CPU 1, and if normal, it delivers a normal response signal RES-1 (hereinafter abbreviated simply as RES-1) to the transaction device.

Next, the transaction signal issues an identification number request command signal COM-2 (hereinafter abbreviated simply as COM-2) for knowing the identification number. Against this, the electronic bankbook reads out the identification data of 4 bytes stored in the second data memory 4 therefrom, and transfers it as R DATA-1 to the transaction device.

Upon obtaining coincidence between the secret numbers, the customer conducts receipt/payment operation.

The transaction device issues a customer's attribute data request command signal COM-3 (hereinafter abbreviated simply as COM-3) for knowing a customer's attribute data. Against this, the electronic bankbook reads out 258 bytes of information codes and attribute data stored in the second data memory 4 based on the customer's information code instructed by the COM-3, and transfers them as R DATA-2 to the transaction device. Here, processing from the signalling of the COM-3 to the transfer of the R DATA-2 may be neglected.

Then, the transaction device, when there are, for example, five transactions in total, i.e., the present transaction, and four other transactions which have been not entered in the bankbook because of the automatic drawing of money, or transactions for five lines printed on a booklet type bankbook using paper, transmits a COM-1 signal to the electronic bankbook for requesting the state of the bankbook. Against this, the electronic bankbook, if not abnormal, delivers an RES-1 signal to the transaction device.

The transaction device, upon receiving the RES-1 signal, transmits a transaction data write command signal COM-4 (hereinafter abbreviated simply as COM-4) and a transaction data (hereinafter abbreviated to W DATA-1) for writing the four non-entered transactions in date order from the oldest data in the first data memory 3 of the electronic bankbook. Then, the electronic bankbook stores the W DATA-1 delivered from the transaction device in the first data memory 3 according to the data format shown in FIG. 3. The electronic bankbook, if normal, transmits a RES-1 signal to the transaction device.

The transaction device further transmits the COM-4 and the W DATA-3 signal, while the electronic bankbook stores the W DATA-3 in the first data memory 3.

Thereupon, the CPU 1 is informed, from the first data memory 3, of a near end state where data storage capacity approaches its capacity limit, and the CPU 1 delivers a near end status signal RES-2 (abbreviated simply as RES-2 hereinafter) to the transaction device.

A decision as to the near end at this time is conducted as follows. Namely, a detector means provided in the CPU 1, after receipt of transaction data delivered from the transaction device, i.e., after the W DATA-3 is stored in the first data memory 3, evaluates $X = m - 68 \times n$, where m is a total number of bytes, and n the number of transaction units which already have stored data, and there are 68 bytes of one-transaction data. The detector means decides the near end state if $X < 68$.

The transaction device, after receiving the RES-2 signal from the electronic bankbook, issues a transaction data request command signal COM-5 (hereinafter abbreviated simply as COM-5) for taking in all the transaction data stored in the first data memory 3. The electronic bankbook transfers 68 bytes from the starting address of the first data memory 3 as one block (DATA-1) to the transaction device.

The transaction device, after receiving the DATA-1 from the electronic bankbook, transfers it to a printing output part provided in the transaction device, which prints the transferred signal on roll paper or a single card according to a bankbook format specified beforehand.

Details of the printing operation with this arrangement will be described later. Next, the transaction device 71 delivers the COM-1 signal to the electronic bankbook 73. Against this, the electronic bankbook 72, if a transaction details data is left behind therein, transfers an RES-2 signal to the transaction device 71. The transaction device 71 again transmits the COM-5 signal for requesting the next transaction details data to the electronic bankbook 73, while the electronic bankbook transfers DATA-2 to the transaction device 71. The transaction device 71 prints out the data via a bankbook format printer control part 74. The operation is repeated until all of the transaction data stored in the electronic bankbook is transferred to the transaction device 71.

Here, all of the transaction details data stored in the electronic bankbook 73 are transferred to the transaction device 71, and after receiving the COM-5 signal transmitted by the transaction device 71, the electronic bankbook 73 transfers an RES-3 signal (data transfer completion response). Thus, the electronic bankbook 73 is initialized with the above situation.

Further, the transaction device 71 issues the COM-1 signal for writing the remaining two transactions from among the five transactions which have been interrupted. Against this, the electronic bankbook 73 transfers the RES-1 signal if not abnormal. Then, the transaction device 71 transmits the COM-4 and W DATA 4 signals, while the electronic bankbook 73 transfers the RES-1 signal if not abnormal. The transaction device 71, after receiving the transferred signal, transmits the COM-4 and W DATA 5 signals. Against this, the electronic bankbook 73 transfers the RES-1 signal if not abnormal. The transaction device 71 receives the RES-1 signal with the same procedures as before and completes the operation. By contrast, printing of the transaction details data stored in the electronic bankbook 73 ends simultaneously with this.

In addition, prior to the detection of the near end of the first data memory 3 by the electronic bankbook 73, if the customer is desirous of outputting the data stored in the data memory 3 on a printer 75 of the transaction device 71, the electronic bankbook 73 is adapted to effect the equivalent processing as it receives a signal showing the first data memory 3 and the second data memory 4 are at their near ends by making use of a printing instructing means such as an operating button provided on an I/O part 77 which instructs the transaction details storage data of the electronic bankbook 73 to be outputted. At this time, an indication is provided on a display 82 of the transaction device 71, which shows whether or not the customer is desirous of outputting the transaction details data.

In succession, operation of the printing of the transaction details data stored in the electronic bankbook 73 will be described with reference to FIGS. 7 and 8.

As shown in FIG. 7, element 71 is a transaction device having a buffer memory 72 which stores transaction details data supplied from an electronic bankbook 73 (the same arrangement as in FIG. 1). Element 74 is a bankbook format printing controller, which serves to edit transaction details data stored in the buffer memory 72 into, for example, a bankbook printing format shown in FIG. 8 and control a printer 75 to print the data on a printing medium 76 such as roll paper. Element 77 is an I/O part, which has a printing output means such as a push button for instructing transaction details data stored in the electronic bankbook 73 to be outputted. Element 78 is a CPU, which effect control in the transaction device 71 and control of signal delivery between the transaction device 71 and the electronic bankbook 73. Element 80 is an interface, which is connected to the interface 7 of the electronic bankbook 73 by means of a photocoupler in the present embodiment for delivering data. Element 82 is a display composed of a liquid crystal display, etc. Furthermore, the buffer memory 79, etc., may be integrally formed as an integrated circuit.

As shown in FIG. 7, the transaction device 71, upon receiving transaction data from the first data memory 3 in the electronic bankbook 73 via the interfaces 7 and 80, stores the transaction data in the buffer memory 72. With the first transaction data stored in the buffer memory 72, the transaction data is transferred in succession to the bankbook format printing controller 74 in the transaction device 71, which then prints the data on a printing paper sheet 76 via the printer 75 according to the bankbook printing format shown in FIG. 8. The printing speed usually ranges from 80 to 120 characters/sec, which is very low as compared with a data delivery rate from or to the first data memory 3 in the electronic bankbook 73. Accordingly, the transaction device 71, although in the middle of printing by the printer 75, successively issues data transfer requests to the electronic bankbook 73, and stores in order transaction data delivered from the electronic bankbook 73 in the buffer memory 72.

Thereafter, as long as transaction data has been stored in the buffer memory 72, the transaction data is transferred to the bankbook format printing controller 74 for successive printing. In the course of the printing operation, the printing paper sheet 76 is discharged in order from the transaction device 71. After all the past transaction details data delivered from the electronic bankbook 73 are printed, the printing paper sheet 76 is cut off by pulling out the electronic bankbook 73 from the transaction device 71, and is delivered to the customer.

Next, processing when writing into the first data memory 3 is disabled will be described with reference to FIGS. 9 to 11.

First, as shown in FIG. 9, when there is any abnormality in the first data memory 3 while the transaction device is writing transaction data in the first data memory 3 of the electronic bankbook using the COM-4 and W DATA-1 signals, for example, when a parity error is detected or a check code error is detected in the course of rereading the contents of the first data memory 3 for checking the transaction data normally written in the memory 3, a write abnormal end response signal RES-4 is delivered by a detector means provided in the CPU 1 from the electronic bankbook to the transaction device.

In addition, as shown in FIG. 10, provided that any abnormality in the electronic bankbook is detected by the detector means as the COM-1 signal is issued form the transaction device prior to the transactions, an electronic bankbook abnormality response signal RES-5 is delivered from the electronic bankbook to the transaction device.

Furthermore, as shown in FIG. 11, there is a case where the electronic bankbook does not respond to the COM-1 signal from the transaction device.

In such a manner, when various abnormality response signals are returned from the electronic bankbook or there is no response to various command signals issued from the transaction device, the transaction device performs a retry sequence at need. As a result, provided that it is decided that writing into the first data memory 3 is to be disabled, the electronic bankbook is incorporated into the transaction device. Thereafter, the transaction device guides reissue processing of the electronic bankbook by an operator. First, when the electronic bankbook 73 is connected to the transaction device 71 via the interface part 11, the transaction device 71 reads a secret number stored in the data memory 4 of the electronic bankbook 73. Thereupon, if a validity code of the electronic bankbook 73 is not a "1", the electronic bankbook 73 does not transfer the secret number.

In this instance, data for deciding whether the electronic bankbook 73 is valid or invalid, i.e., an identification code, is stored in the first address of the data memory 4, for example. In an ordinary state, that code is a "1". In this situation, the electronic bankbook 73 can be connected to the transaction device 71, and transaction details can be displayed by operation of the key switch part 6 included in the electronic bankbook 73.

If a "0" is written here in the first address of the data memory 4, the electronic bankbook 73 becomes invalid, and allows "Impossible to be used, please carry your bankbook to the nearest banking organ." to be displayed on the display 5 of the electronic bankbook 73 during about 1 sec for every depression of the key switch part 6 included in the electronic bankbook 73. When the electronic bankbook 73 is connected to the transaction device 71, abnormality responses are provided at all times except for the reception of "reissue command". But, transaction details data which have been stored are left as is.

Then, the transaction device 71 prompts the customer to enter this secret number, and decides whether there is coincidence between the entered secret number and a secret number read from the electronic bankbook 73. With coincidence, the transaction processing is continued in succession, while with non-coincidence, the transaction device further prompts the customer to enter his secret number. Then, the number of retry times of identification inputs is counted. If the number exceeds a prescribed number of input times, an "invalid" command is issued to the electronic bankbook 73, and the transaction is stopped. Namely, the validity code in the data memory 4 is erased as the electronic bankbook receives the "invalid" command. In other words, a "0" is written in the first address of the data memory 4, and the electronic bankbook is defined to be an invalid bankbook.

Figure 14:
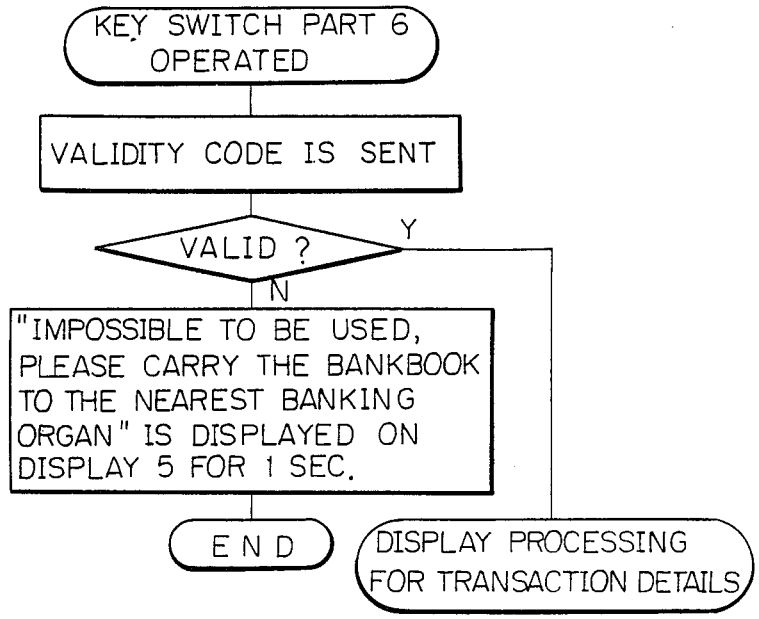
FIG. 14 is a flowchart illustrating a processing procedure for invalidity display of the electronic bankbook with operation of the key switch part 6.

Here, a processing procedure for the invalid display of the electronic bankbook will be described with reference to FIG. 14.

Depressing the key switch part 6, the validity code is first read, and if it is a "1" and valid, display processing for transaction details is effected in response to an instructed key switch part 6. If the validity code is a "0" and invalid, "Impossible to be used, please take your bankbook to the nearest banking organ." is displayed on the display 5 of the electronic bankbook, for example, during about 1 sec.

Figure 15:
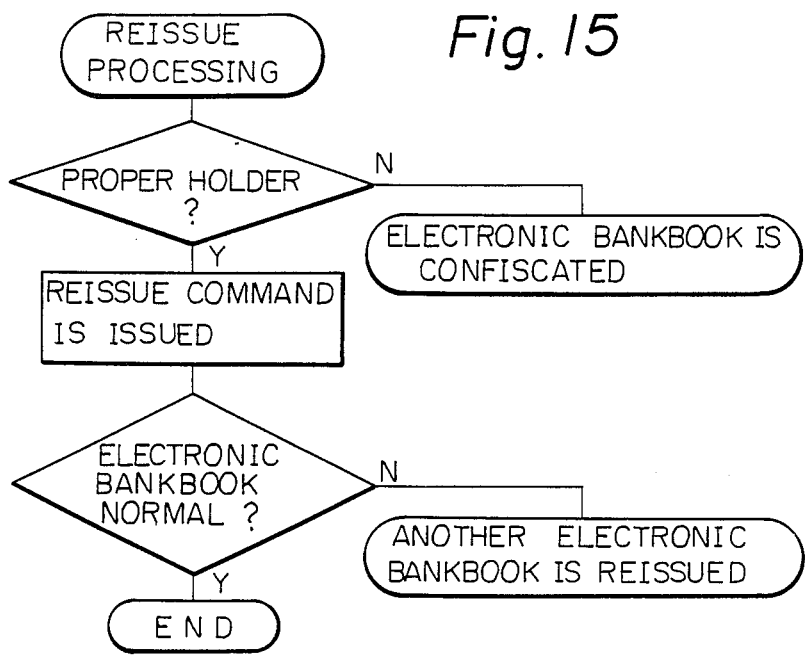
FIG. 15 is a flowchart illustrating a reissue processing procedure for the electronic bankbook on the side of transaction device 71 or on the side of electronic bankbook reissuing device (not shown)
Figure 16:
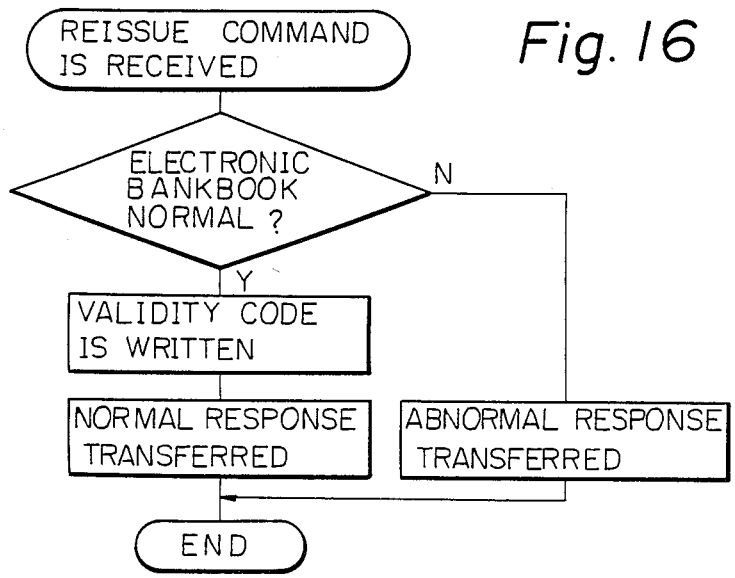
FIG. 16 is a flowchart illustrating a reissue processing procedure for the electronic bankbook on the side of electronic bankbook.

Next, a reissue processing procedure for an electronic bankbook on the side of the transaction device 71 or the side of the electronic bankbook reissuing device (not shown) will be simply described below with reference to FIGS. 15 and 16.

Usually, the lack of coincidence of secret numbers over the prescribed number of times may infer that an improper holder is operating the system, but the same trouble may be rarely produced because a proper holder has forgotten his secret number. For the latter case, it is necessary to restore an electronic bankbook previously made invalid to an available state.

For the invalid electronic bankbook, if the holder of the bankbook can be properly confirmed by explanation of the situation to a bank clerk, a reissue command is issued for the electronic bankbook by the specific operation of the transaction device 71 or the connection of an electronic bankbook reissuing device by the bank clerk. If the holder of the electronic bankbook is an improper person, the bank clerk confiscates the bankbook.

On the contrary, as the electronic bankbook is subjected to a reissue command, if the interior of the electronic bankbook is normal, a "1" is written in the first address of the data memory 4 to make it valid, and allows a normal response to be transferred. In addition, if the interior of the above electronic bankbook is abnormal, an abnormality response is transferred to inform the clerk of it via the electronic bankbook reissuing device, etc. Furthermore, the electronic bankbook, if staying in an invalid state, returns abnormality responses for commands other than the reissuing command, and makes it impossible to conduct transactions. Moreover, the invalid state of the electronic bankbook is decided as described before only by the first address/data of the data memory 4. Consequently, the electronic bankbook can be reused without destroying transaction details data. As a result, even if an electronic bankbook is made invalid because the holder of the electronic bankbook forgets his number although he is a proper holder, with the reissuing processing, the electronic bankbook can be used likewise without losing previously stored transaction details.

It is possible to apply the electronic bankbook described in the embodiment to a credit card, a bond, an insurance policy, as well as to a deposit and saving passbook. Therefore, the electronic bankbook according to the present invention includes these credit cards, bonds, insurance policies in addition to the deposit and saving passbook.

With the arrangement of the embodiments of an electronic bankbook and a transaction system for use therewith according to the present invention, the electronic bankbook serves to optionally display transaction data of a multi-item bank account for a fixed deposit and an ordinary deposit, etc., stored in the data memory by means of an operating switch. The latest or past transaction of a desired item account can be optionally displayed by operating, for example, an ordinary deposit key, a fixed deposit key, a 52 key, and a 75 key of an operating switch. Accordingly, desired transaction details can be known with ease, while a plurality of item accounts can be transacted with one sheet of the electronic bankbook.

In addition, desired data can be displayed by allowing a utilization of validity decision data such as individual identification data and data in response to purposes of use stored in a data memory, and searching for this data with an operating switch. Accordingly, the electronic bankbook can be widely used as an admission check card, a credit card, and utilization validation card, etc.

Moreover, a first data memory and a second data memory are provided. Only data stored in the first data memory can be displayed on a display with the operation of a key switch, while data stored in the second data memory is arranged so as not to be displayed on a display. Consequently, if data which is not open to a customer is stored in the second data memory, its secrecy can be maintained.

Thus, all of the customer's attribute data which is stored up to now in a memory file system of a data processing center in a banking organ can be decentralized into respective customer's electronic bankbooks and stored. Thus, burdens of the processing center can be lightened, while processing capability can be improved.

Furthermore, according to the present invention, data storage capacity is not only greatly increased as compared with a prior booklet type bankbook, but various data including the customer's attribute data can be stored. Accordingly, uses thereof can also be widened. Furthermore, a mechanical part of the transaction device is more simplified than a booklet type bankbook taking various forms. Consequently, the transaction device can be miniaturized and low-cost. Moreover, transaction data is rewritable in repetition in the data memory. Therefore, the total cost of the electronic bankbook can be reduced as compared with that of a booklet type bankbook.

Moreover, the electronic bankbook according to the present invention has means which serves to detect a near end state of the electronic bankbook when the amount of data stored in the data memory in the electronic bankbook reaches a limit of the storage as well as to detect a write disable state of data into the data memory, and to deliver the detected signal to the transaction device. Accordingly, when the data memory reaches a near end state, past transaction data stored in the data memory is printed on a prescribed paper sheet by the transaction device based on a signal supplied from the above noted means. Consequently, new transaction data can be written in the data memory which has been initialized as a result of the above noted operation.

Therefore, past transaction data can be printed on a paper sheet and stored, so that the data cannot only be prevented from being erased, but repetitive use of the electronic bankbook can be achieved. This improves reliability of the electronic bankbook together with a reduction of expenses and a saving of the labor required therefore.

In addition, even if data writing becomes impossible due to a trouble of the data memory, it can be detected and transmitted to the transaction device. Consequently, the signal can instruct a bank clerk of the banking organ to reissue the electronic bankbook through the transaction device. Thus, a new electronic bankbook can be issued without troubling the customer.

Furthermore, according to the electronic bankbook of the present invention, customer's attribute data which has been stored up to now in a memory file system of data center in a banking organ and requires secrecy can be stored in a data memory in the electronic bankbook, so that burdens of the data processing center can be lightened.

In addition, according to the present invention, transaction details data are printed on a printing medium via a printer based on the operation of the printing instructing means or detection of the memory near end of the electronic bankbook, and delivered to a customer. Accordingly, a bank customer can profitably employ the electronic bankbook without a feeling of physical disorder as compared with a paper bankbook employed up to now, and preserve same with ease. Furthermore, a bank can employ in repetition the electronic bankbook comprising a relatively expensive IC card. Consequently, the electronic bankbook can be efficiently employed at a low price.

Furthermore, according to the transaction system of the present invention, when the electronic bankbook is coupled with the transaction device, and the identification is erroneously entered over the prescribed number of times, transactions are interrupted keeping a state where stored transaction details have been successively stored as is, and use by an improper holder of the electronic bankbook can be prevented by displaying "invalid" on a display every time the operating switch is depressed. In addition, it is possible to inform the proper holder of the electronic bankbook that the electronic bankbook is disabled and a reissue procedure of the electronic bankbook must be performed.

Furthermore, according to the present invention, when the electronic bankbook becomes invalid in a state where stored transaction details have been stored in succession as is, if a valid or invalid identification code stored in the electronic bankbook is rewritten, the bankbook can be reused without losing the transaction details data stored up to now. Accordingly, even if a proper holder of the electronic bankbook forgets his secret number, and the electronic bankbook becomes invalid, it can be again employed as before only with particular processing.

Although, certain preferred embodiments have been shown and described, it should be understood that many changes and modifications may be made therein without departing from the scope of the appended claims.

What is claimed is:
1. An electronic bankbook comprising:
   (a) an IC chip encapsulated in an insulating card substrate and composed of a CPU, first and second data memories which are both connected to said CPU for storing transaction data and customer's attribute data, a program memory connected to said CPU and said first and second data memories for storing a program to control said electronic bankbook;

(b) a key switch having keys connected to said CPU;
(c) a display connected to said CPU and a key switch for optionally displaying data stored in one of said first and second data memories on said display by means of said key switch;
(d) a power supply means for backing up contents of said data memories and for supplying power to said electronic bankbook;
(e) a transaction device provided external to said electronic bankbook for controlling said electronic bankbook; and
(f) a means connected to said CPU and said transaction device for receiving or delivering a signal from or to said transaction device;
wherein addresses of said first and second data memories are distinguishable from each other such that only data stored in said first data memory is displayed on said display by means of said key switch; and
wherein transaction data showing transaction results is stored in said first data memory, while customer's attribute data is stored in said second data memory.

2. A transaction system employing electronic bankbooks, wherein each of said bankbooks comprises:
(a) an IC chip encapsulated in an insulating card substrate and composed of a CPU, first and second data memories which are both connected to said CPU for storing transaction data and customer's attribute data, a program memory connected to said CPU and said first and second data memories for storing a program to control said electronic bankbook;
(b) a key switch having keys connected to said CPU;
(c) a display connected to said CPU and a key switch for optionally displaying data stored in one of said first and second data memories on said display by means of said key switch;
(d) a power supply means for backing up contents of said data memories and for supplying power to said electronic bankbook;
(e) a transaction device provided external to said electronic bankbook for controlling said electronic bankbook; and
(f) a means connected to said CPU and said transaction device for receiving or delivering a signal from or to said transaction device;
wherein addresses of said first and second data memories are distinguishable from each other such that only data stored in said first data memory is displayed on said display by means of said key switch;
wherein transaction data showing transaction results is stored in said first data memory, while customer's attribute data is stored in said second data memory;
and wherein data representing the contents of transactions stored in said first data memory is edited in a bankbook printing format and the data is printed out when a print command means of an external piece of equipment is operated or upon the detection of the nearly depleted state of the storage area of said first data memory.

3. A transaction system employing electronic bankbooks, according to claim 2, wherein said external piece of equipment transmits an INVALID command to the electronic bankbook when wrong secret code information is entered more than a predetermined times in said external piece of equipment, and wherein said electronic bankbook stores a VALID/INVALID discriminating code in a rewritable memory means, and said electronic bankbook changes the information stored in said memory means for INVALID information upon the reception of said INVALID command and information indicating an invalid state is then displayed during every depression of said key switch.

* * * * *